United States Patent Office 3,660,508
Patented May 2, 1972

3,660,508
POLYCYCLIC COMPOUNDS AND COPOLYMERS DERIVED THEREFROM
Edward Charles Dart, Richard Gregory Foster, and Paul Hepworth, Runcorn, England, assignors to Imperial Chemical Industries Limited, London, England
No Drawing. Filed Aug. 21, 1970, Ser. No. 66,139
Claims priority, application Great Britain, Sept. 3, 1969, 43,585/69
Int. Cl. C07c 13/28, 13/54
U.S. Cl. 260—666 PY                                 18 Claims

ABSTRACT OF THE DISCLOSURE

A polycyclic diene having the structure

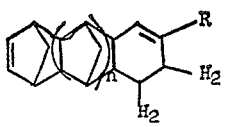

mixtures thereof with a polycyclic diene having the structure

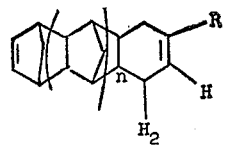

where R is a hydrocarbyl group and n is zero or an integer, derivatives of said dienes in which one or more of the cyclic carbon atoms other than those forming part of a carbon-carbon double bond in an endomethylene bridged ring and those indicated as carrying hydrogen atoms carries a further hydrocarbyl substituent group, a process for their preparation and vulcanisable olefin copolymers derived therefrom.

---

This invention relates to polycyclic dienes, to a process for their production and their use in vulcanisable olefin copolymers.

It is known to prepare vulcanisable copolymers by copolymerisation of a non-conjugated diene with ethylene and at least one α-olefin, for example, propylene or butene-.1 Non-conjugated dienes which may be used include, for example, straight chain dienes, e.g. 1:4-hexadiene and 1:5-hexadiene; cyclic dienes, e.g. 1:5-cyclo-octadiene; and alkenyl cyclic dienes, e.g. 4-vinyl cyclohexene-1. The prime requirements of the dienes are that one of the double bonds in the diene should be readily copolymerisable with a mixture of ethylene and at least one α-olefin and that the other double bond should be substantially inactive during polymerisation and should be available in the resultant polymeric product as a site at which vulcanisation may be effected to yield an elastomer having good tensile properties.

Many dienes, for example, the dienes discussed above, are not readily copolymerisable with ethylene and at least one α-olefin. Dienese which are readily copolymerisable are those in which one of the double bonds is present in an endomethylene bridged ring, for example, dicyclopentadiene. However, some of the dienes containing such a double bond, and in particular dicyclopentadiene, suffer from the disadvantage that the other double bond in the diene is reactive during polymerisation with the result that cross-linking may take place during polymerisation and the resultant polymeric product may thus contain cross-linked gel and be difficult to process.

We now provide a new class of polycyclic dienes which substantially overcomes this disadvantage and which satisfies the prime requirements outlined above.

According to the present invention we provide a polycyclic diene having the structure

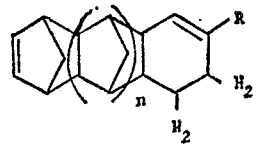

where R is a hydrocarbyl group and n is zero or an integer, or a derivative of said polycyclic diene of structure I in which one or more of the cyclic carbon atoms other than those forming part of a carbon-carbon double bond in an endomethylene bridged ring and those indicated as carrying hydrogen atoms carries a further hydrocarbyl substituent group.

On account of the availability of the starting materials from which the polycyclic diene is prepared it is preferred that in the diene of structure I above the cyclic carbon atoms other than that carrying the hydrocarbyl group R are unsubstituted, although it is to be understood that the aforementioned derivatives are suitable dienes for use in the production of vulcanisable olefin copolymers.

We prefer, on account of the relative ease of preparation, that n in the diene of structure I above is zero or an integer in the range 1 to 3. More preferably n is zero.

In this preferred embodiment in which n in the diene of structure I is zero the polycyclic diene of our invention is a 6-hydrocarbyl-1,4,7,8,9,10-hexahydro-1,4-endomethylene naphthalene having the structure

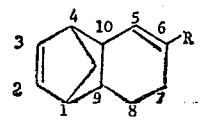

or derivative thereof in which one or more of the carbon atoms in the 1,4,5,9,10 and endomethylene positions carries a further hydrocarbyl substituent group. The hydrocarbyl group R may be alkyl, aryl, cycloalkyl, alkaryl or aralkyl. It is to be understood that by the term alk(yl) we also include cycloalk(yl). For example, R may be an alkyl group having from 1 to 10 carbon atoms and suitably may be, e.g. methyl, ethyl, propyl or butyl. Other suitable hydrocarbyl groups include phenyl, tolyl, benzyl and cyclohexyl. Because of the readily availability of the starting materials for the preparation of the polycyclic diene it is preferred that R be a methyl group.

According to a further embodiment of our invention we provide a process for the preparation of a polycyclic diene as hereinbefore described which comprises either (i) isomerising a polycyclic diene having the structure

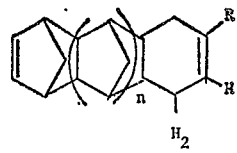

or (ii) isomerising a substituted polycyclic monoene having the structure

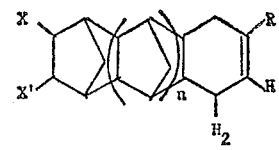

to an intermediate having the structure

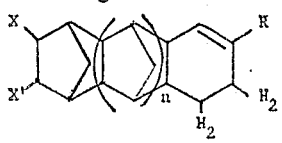

(V)

and subsequently eliminating X and X' from the intermediate, where X and X' are atoms or groups which may be eliminated from the intermediate with the formation of a double bond between the carbon atoms to which X and X' were attached, and in which in the polycyclic diene having the structure III and the polycyclic monoene having the structure IV, R is a hydrocarbyl group and $n$ is zero or an integer and the cyclic carbon atoms other than those forming part of a carbon-carbon double bond in an endomethylene bridged ring and those indicated as carrying hydrogen atoms and atoms or groups X and X' are unsubstituted or one or more of said carbon atoms carries a further hydrocarbyl substituent group.

In preparing the polycyclic dienes having the structure I the isomerisation reaction may not proceed to completion and in a further embodiment we provide a mixture of polycyclic dienes comprising (i) from 1% to 99% by weight of a polycyclic diene having the structure

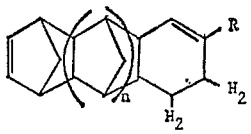

(I)

where R is a hydrocarbyl group and $n$ is zero or an integer, and (ii) from 99% to 1% by weight of a polycyclic diene having the structure

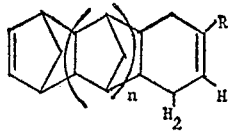

(III)

or derivatives of said polycyclic dienes in which one or more of the cyclic carbon atoms other than those forming part of a carbon-carbon double bond in an endomethylene bridged ring and those indicated as carrying hydrogen atoms carries a further hydrocarbyl substituent group.

Thus, when preparing the polycyclic dienes of our invention by isomerising the polycyclic diene of structure III or derivative thereof the product may comprise a mixture of the latter together with a polycyclic diene of structure I or derivative thereof.

Similarly, in preparing the polycyclic dienes of our invention by isomerising the substituted polycyclic monoene of structure IV or derivative thereof and subsequently eliminating XX' from the intermediate of structure V or derivative thereof the isomerisation may not proceed to completion and the product of isomerisation may comprise a mixture of substituted polycyclic monoene and the intermediate. This mixture may be used in the subsequent stage of the process, in which case elimination of XX' from each of the components of the mixture will produce a product comprising a mixture of polycyclic dienes having the structures I and III, or derivatives thereof.

The isomerisation may be effected catalytically. Catalysts which may be used include acidic catalysts, basic catalysts and Friedel-Crafts catalysts.

Suitable acidic catalysts include, for example, hydrogen halide, e.g., hydrochloric acid, sulphuric acid or perchloric acid, e.g. in the form of a concentrated aqueous solutions of the acids. As basic catalyst it is preferred to use a strong base, for example, an alkali metal alkoxide in an aprotic diluent, for example, potassium tertiary butoxide in dimethylsulphoxide as diluent, preferably under an atmosphere of an inert gas, e.g. nitrogen. The Friedel-Crafts catalyst may be, for example, ferric chloride, zinc chloride, antimony pentachloride, aluminium chloride or stannic chloride. The Friedel-Crafts catalyst may be used in the presence of an inert diluent, for example, methylene chloride, ethylene dichloride or 1:1-dichloroethylene.

The conditions under which it is desirable to effect the isomerisation depend on the nature of the isomerisation catalyst. Thus, where an acidic catalyst is used it is preferred to effect the isomerisation at a temperature in the range 50° C. to 120° C. For example, where the acidic catalyst is used in the form of an aqueous solution the isomerisation may be conveniently effected at the reflux temperature of the water in the aqueous solution. Where the isomerisation catalyst is a strong base the reaction is desirably effected at a temperature in the range 20° C. to 70° C. and where the catalyst is a Friedel-Crafts catalyst it is preferred that the isomerisation be effected at or near ambient temperature. In particular it is desirable to choose an isomerisation temperature at which the Friedel-Crafts catalyst effects little or no polymerisation of the polycyclic diene having the structure III or the substituted polycyclic monoene having the structure IV.

Where it is desired to effect the isomerisation in an inert diluent or an elevated temperature it is particularly convenient to choose a diluent with a boiling point near the temperature at which it is desired to effect the isomerisation, in which case the isomerisation may be effected in the refluxing diluent.

The concentration of the isomerisation catalyst may be varied between wide limits. For example, wherean acidic isomerisation catalyst is used the concentration of the acid may, e.g. be within the range 10% to 50% of acid by weight of the polycyclic diene of structure III or substituted polycylic monene of structure IV. Where basic catalysts or Friedel-Crafts catalysts are used the concentration thereof may suitably be in the range, respectively 11% to 20% by weight, and 5% to 15% by weight on the same basis.

Reaction times of from 5 minutes to 20 hours have generally been found to be suitable, the reaction time necessary to achieve a substantial amount of isomerisation depending on the nature of the catalyst and the temperature of the reaction.

In preparing the polycyclic diene of structure I by isomerisation of a polycyclic diene of structure III with, for example, hydrogen halide, e.g. hydrochloric acid, as the isomerisation catalyst, the hydrogen halide may add across the double bond in the endomethylene bridged ring of the diene of structure III to produce, after isomerisation, an intermediate of structure V in which one of X and X' is hydrogen and the other is halogen, e.g. chlorine. In order to produce the desired diene of structure III XX' must, of course, be eliminated in the form of hydrogen halide, e.g. hydrogen chloride.

The polycyclic diene of structure III for use in the process of our invention may be prepared, in the case where $n$ is zero, in known manner by Diels-Alder reaction of norbornadiene with a 2-hydrocarbyl substituted acyclic conjugated diene having the structure

(VI)

The polycyclic diene of structure III in which $n$ is an integer may be prepared by Diels-Alder reaction of the cyclopentadiene with the polycyclic diene of structure III in which $n$ is zero, the value of $n$ in the product of the Diels-Alder reaction being dependent on the relative proportions of cyclopentadiene and the polycyclic diene of structure III in which $n$ is zero. Thus, we have found that in order to prepare a relatively high proportion of polycyclic diene of structure III in which $n$ is one it is convenient to use a proportion of cyclopentadiene to polycyclic diene of structure III in which $n$ is zero in the range 0.75:1 to 1.25:1.

The substituted polycyclic monene of structure IV for use in the alternative embodiment of our process may be prepared by Diels-Alder reaction of a 2-hydrocarbyl substituted acyclic conjugated diene of structure VI with a norbornadiene having the structure

(VII)

in which $n$ is zero or an integer. The norbornene of structure VII may itself, in the case where $n$ is zero, be prepared in known manner by reaction of cyclopentadiene with an olefin having the structure $$X—CH=CH—X' \qquad VIII$$

In the case where $n$ in the norbornene of structure VII is an integer it may be prepared by Diels-Alder reaction of cyclopentadiene with a norbornene of structure VII in which $n$ is zero, the use of a molar proportions of cyclopentadiene to norbornene of structure VII in which $n$ is zero in the range 0.75:1 to 1.25:1 favouring the production of a relatively high proportion of norbornene of structure VII in which $n$ is one.

In preparing the polycyclic diene having the structure III or the substituted polycyclic monoene having the structure IV by the methods hereinbefore described, mixtures of such polycyclic dienes having different values of $n$ or mixtures of such substituted polycyclic monoenes having different values of $n$ may be formed. If desired the mixtures of polycyclic dienes, or the mixtures of substituted polycyclic monoenes, may be separated, for example, by distillation, or they may be used in the process of our invention without separation, and, if desired, separated at a later stage in the process.

In order to prepare derivatives of polycyclic dienes of structure I in which one or more of the cyclic carbon atoms other than those forming part of a carbon-carbon double bond in an endomethylene bridged ring and those indicated as carrying hydrogen atoms carries a further hydrocarbyl substituent group it will, of course, be necessary to use in the Diels-Alder reactions hereinbefore described correspondingly hydrocarbyl substituted norbornadiene, acrylic conjugated diene of structure VI, cyclopentadiene, or olefin of structure VIII.

The Diels-Alder reactions hereinbefore described are preferably effected at elevated temperature and pressure, for example, in an autoclave, preferably in the absence of air and moisture, e.g. in the presence of an inert gas, e.g. nitrogen. Inert diluents may be present if desired. Suitably temperatures in the range 50° C. to 300° C. and pressures up to 100 atmospheres may be used. Temperatures in the range 150° C. to 250° C. under the autograms presence of the reactants are preferred. Reaction times of from 5 minutes to 30 hours may be suitable, although shorter or longer times may be used.

In Diels-Alder reactions in which an acyclic conjugated diene of structure VI is reacted with norbornadiene or with a norbornene having the structure VII it is preferred to effect the reaction in the presence of an excess of the norbornadiene or norbornene having the structure VII if the by-production of large concentrations of the dimers of the acyclic conjugated diene is to be minimised. Suitably the Diels-Alder reactions may be effected in a two-fold to five-fold excess of the norbornadiene or norbornene of structure VII.

The nature of X and X' is such that the compound XX' may be eliminated from the intermediate having the structure V with the formation of a double bond between the carbon atoms to which X and X' were attached. For example, one of X and X' may be hydrogen and the other may be hydrogen or an ester group derived from a lower alkanoic acid containing, for example, up to six carbon atoms. Preferably at least one of X and X' is hydrogen and the other is a halogen atom, e.g. chlorine, i.e. the olefin having the structure VIII is preferably a vinyl halide e.g. vinyl chloride.

The elimination of XX' from the intermediate having the structure V may be effected in a number of ways; for example pyrolytically, catalytically, electrolytically or by chemical reaction, the method chosen depending on the nature of the groups X and X'. For example, where one of X and X' is hydrogen and the other is halogen, e.g. chlorine, XX' may be eliminated by reaction with a base. Suitable bases include for example alkali metal alkoxides, for example, a potassium alkoxide or a sodium alkoxide, e.g. potassium tertiary butoxide or sodium tertiary butoxide. The reaction of the intermediate having the structure V with the base is preferably effected at elevated temperatures, if desired, in the presence of an inert diluent, for example, at the reflux temperature of the inert diluent. Alternatively, the reaction may be effected in a sealed pressure vessel, if desired in the presence of an inert diluent and preferably at a temperature in the range 150° C. to 250° C.

It will be appreciated that in the Diels-Alder reactions described herein dicyclopentadiene may be used in place of cyclopentadiene, provided the temperature of reaction is above the temperature at which dicyclopentadiene dissociates to cyclopentadiene at a rate which is faster than the reverse reaction.

The polycyclic dienes or mixtures of polycyclic dienes of our invention may be used in the production of vulcanisable olefin copolymers and according to a further embodiment of our invention we provide an amorphous, high molecular weight vulcanisable copolymer of ethylene, at least one α-olefin having from 3 to 8 carbon atoms and (i) at least one polycyclic diene having the structure

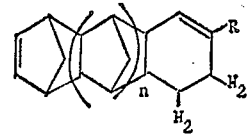

(I)

or derivative thereof as hereinbefore described, or (ii) a mixture of polycyclic dienes comprising (a) from 1% to 99% by weight of at least one polycyclic diene having the structure I or derivative thereof as hereinbefore described, and (b) from 99% to 1% by weight of at least one polycyclic diene having the structure

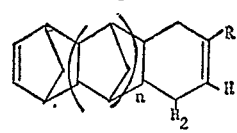

(III)

or derivative thereof as hereinbefore described.

Examples of α-olefins suitable for copolymerisation with ethylene and at least one of our polycyclic dienes or mixtures of polycyclic dienes include propylene, butene-1, pentene-1, 2-methyl pentene-1, 4-methyl pentene-1 hexene-1, heptene-1, octene-1 and 3,5,5-trimethyl pentene-1. Propylene is preferred because of its availability and the properties of the products derived from it.

In general, we prefer our copolymers to contain at least 10% by weight of each of ethylene and α-olefin and at least 1% by weight of polycyclic diene or mixture of polycyclic dienes. More preferably the copolymer contains at least 30% by weight of each of ethylene and α-olefin and from 1% to 15% by weight, preferably 2% to 10% by weight of polycyclic diene or mixture of polycyclic dienes.

Our copolymers may be prepared by copolymerising at least one of our polycyclic dienes or mixtures of polycyclic dienes with ethylene and at least one α-olefin containing from 3 to 8 carbon atoms in the presence of an anionic co-ordination catalyst. Suitably a halogen-containing anionic co-ordination catalyst comprising a compound of a metal of Group Vb of the Periodic Table of the Elements and a metal of Groups Ia, II or IIIa of the Periodic Table of the Elements, or an alloy, hydride, complex hydride or organo-metallic compound thereof may be used, the two components being chosen such that at least one contains halogen, generally chlorine or bromine.

The preferred Group Vb metal compounds are compounds of vanadium although niobium and tantalum compounds may also be used.

Of the metals of Groups Ia, II and IIIa, aluminium is much preferred, especially in the form of organo-aluminium compounds, although others that may be mentioned include lithium and beryllium. For example, there may be used trialkyls, dialkyl monohalides, monoalkyl dihalides, or sesquihalides of aluminium. Suitable examples include aluminium triethyl, aluminium triisobutyl, aluminium trihexyl, aluminium diethyl monochloride, aluminium ethyl dichloride and aluminium sesquichloride.

The metal compounds of Group Vb are preferably soluble in the polymerisation medium and are generally halides or oxyhalides, e.g. vanadium tetrachloride, vanadium oxychloride and vanadium tetrabromide, or compounds wherein at least one of the vanadium valencies is satisfied by an oxygen or nitrogen atom linked to an organic group, e.g. the triacetylacetonate of vanadium.

Particular examples of suitable catalyst systems are aluminium diethyl chloride with vanadium triacetylacetonate, vanadium tetrachloride or vanadium oxytrichloride; aluminium tri(n-hexyl) with vanadium tetrachloride; and aluminium triisobutyl with vanadium oxytrichloride.

Preferably, the catalyst components are wholly dissolved, highly dispersed or amorphous colloidally dispersed in the polymerisation medium.

The activity of the co-ordination catalyst system varies according to the molar ratio of the compounds employed and the optimum ratio depends upon the choice of individual catalyst components. For example, as a general rule if aluminium trialkyls are used with vanadium halides or oxyhalides the preferred ratio will be in the range 1:1 to 20:1 and generally 2:1 to 4:1. The preferred ratios are different if aluminium dialkyl halides are used in place of the trialkyls; for example, with vanadium triacetylacetonate the best results are usually obtained by using a 4:1 to 10:1 molar ratio. The preferred molar ratio for aluminium diethyl chloride with vanadium tetrachloride is about 5:1 while that for aluminium triisobutyl with vanadium oxychloride is about 2:1.

The polymerisation may be carried out in the presence of a diluent which may be a hydrocarbon or a mixture of hydrocarbons, e.g. n-hexane, n-heptane, toluene, xylene and mixtures of these. However, the polymerisation may also be effected in the absence of such diluents by using the comonomers in liquid form. The temperature chosen for the polymerisation will depend upon the nature of the catalyst components and the choice of monomers but will generally be in the range —50° C. to +60° C. Where high molecular weight polymers are desired and a catalyst system comprising vanadium and aluminium compounds is used, it is preferred to effect the polymerisation, and preferably prepare the catalyst also, at a temperature below +10° C.

If desired, the polymerisation system may be pressurised, e.g. by ethylene or a mixture of the ethylene and α-olefin where the latter is also gaseous. Constant pressure conditions may be maintained by feeding ethylene, or the mixture of ethylene and gaseous α-olefin, into the system at the rate at which it is used up in the polymerisation.

An oxygen-free atmosphere is desirable to avoid de-activation of the catalyst system and the polymerisation may be effected in an atmosphere composed of the gases of the monomers to be polymerised or, if desired, in an atmosphere of an inert gas, e.g. nitrogen.

In order to obtain good vulcanisation properties, it is preferred to obtain the most random distribution of the residues of the diene throughout the polymer chains. This may be achieved by the use of a continuous polymerisation process wherein a mixture of the monomers of constant or substantially constant composition is continuously fed into the reaction vessel at high space velocities and, if desired, recirculated. In a continuous process, catalyst components may be fed continuously into the polymerisation zone. Alternatively, a mixture of the monomers may be fed into the reaction vessel at a rate substantially the same as the rate at which they are incorporated into the polymer.

On completion of polymerisation, the catalyst may be de-activated, and the polymer solution may be removed and treated to remove catalyst residues. The polymer may then be separated, e.g. by precipitation into a non-solvent therefor, washed and dried.

The amorphous polymeric products obtained from the copolymerisation of our polycyclic dienes or mixture of polycyclic dienes with ethylene and α-olefins are rubbery unsaturated materials which may be vulcanised using the methods normally employed for unsaturated rubbers and may be used in applications, e.g. in the formation of shaped articles, where synthetic rubbers have been used hitherto. Before vulcanisation they may be mixed with plasticisers, fillers and pigments and vulcanisation catalysts and other additives commonly used with such materials.

The invention is now illustrated by the following examples in which all parts are expressed as parts by weight.

Example 1

A stainless steel autoclave was flushed with nitrogen and charged with 186 parts of dicyclopentadiene and 325 parts of vinyl chloride. The autoclave was then sealed, heated to a temperature of 190° C., maintained at this temperature for 3 hours, allowed to cool to room temperature and vented, and the unreacted vinyl chloride allowed to evaporate.

The contents of the autoclave were charged to a distillation apparatus and distilled through a 2 ft. silvered vacuum jacketed column packed with glass helices. An initial fraction distilling at temperatures up to 50° C. at 15 mm. Hg pressure was discarded and 70.5 parts of a fraction of norbornenyl chloride distilling at 52° C. at 15 mm. pressure was collected. 62.5 parts of undistilled residue remainded.

A stainless steel autoclave was flushed with nitrogen and charged with 51 parts of norbornenyl chloride and 7 parts of isoprene. The autoclave was sealed, heated to a temperature of 170° C., maintained at this temperature for 3 hours and thereafter allowed to cool and the contents of the autoclave charged to a distillation apparatus and distilled through a 2 ft. silvered vacuum-jacketed column packed with glass helices. 42 parts of unreacted norbornenyl chloride distilling at 70° C. at 50 mm. Hg pressure were recovered. Further fractions distilling at temperatures up to 100° C. at 10 mm. Hg pressure were discarded and 9.7 parts of

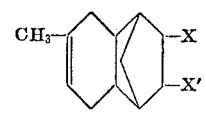

wherein one of X and X' is hydrogen and the other is chlorine, were collected at 120° C. at 10 mm. Hg pressure. 4.3 parts of undistilled residue remained.

8 parts of

wherein one of the groups X and X' is hydrogen and the other is chlorine, and 15.2 parts of concentrated hydrochloric acid in water (having a specific gravity of 1.18 gm./ml.) were charged to a flask fitted with a stirrer and a reflux condenser and heated at a temperature of 80° C. for 6 hours. The contents of the flask were then allowed to cool, poured into water and extracted three times with ether. The other solution was dried by standing over anhydrous sodium sulphate for two hours. The ether was then evaporated and the residue distilled through a 2 ft. Vigreux column and 5.2 parts of a fraction distilling at 80° C. to 118° C. at 10 mm. Hg pressure (mainly 116° C.) were collected. The fraction was analysed by gas-liquid chromatography at a temperature of 145° C. on a 17 ft. long capillary column coated with a stationary phase of LAC 14R 743 and was shown to contain 14% by weight of

and 86% by weight of

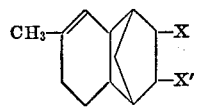

wherein one of the groups X and X' is hydrogen and the other is chlorine.

If desired, the reaction of

with concentrated hydrochloric acid could have been effected for a time sufficient to isomerise the

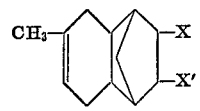

substantially completely to

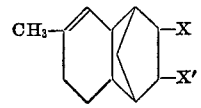

the product thereby obtained could have been used in the further stages of the synthesis and the resulting polycyclic diene used in the subsequent copolymerisation. However, in this example the fraction containing the mixture of

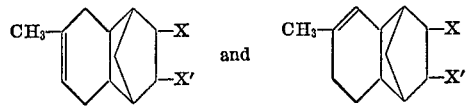

was used in the further stages of the synthesis.

This fraction was charged to a flask fitted with a stirrer and a reflux condenser and was heated to a temperature of 200° C. 2.8 parts of potassium tertiary butoxide were gradually added to the flask over a period of 30 minutes. After the addition had been completed the contents of the flask were allowed to cool and were poured into water and were extracted three times with ether. The ether extract was dried by standing over anhydrous sodium sulphate for 2 hours. The ether was then evaporated and the residues distilled through a 2 ft. long Vigreux column and 3.3 parts of a fraction containing 86% by weight

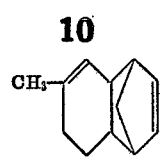

and 14% by weight

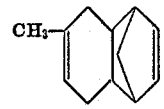

and distilling in the range 86° C. to 90° C. at 8 mm. Hg pressure were collected. The fraction was analysed by gas-liquid chromatography and the structures of the products identified by NMR spectroscopy.

Example 2

30 parts of

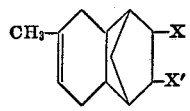

wherein one of the groups X and X' is hydrogen and the other is chlorine (prepared as described in Example 1), 124 parts of dioxan and 15.4 parts of an isomerization catalyst consisting of an aqueous solution of perchloric acid having a specific gravity of 1.54 g./ml. were charged to a flask fitted with a stirrer and a reflux condenser and heated under reflux for 6 hours. The contents of the flask were then allowed to cool and were poured into water and extracted twice with 60/80 petroleum ether which was then washed with 10% aqueous sodium bicarbonate until neutral and dried by standing over anhydrous sodium sulphate.

The petroleum ether was then allowed to evaporate and the residue remaining was distilled through a 2 ft. Vigreux column and 10.3 parts of a fraction boiling in the range 125° C. to 130° C. at 10 mm. Hg pressure were collected. This fraction was analysed by gas-liquid chromatography following the procedure of Example 1 and shown to consist essentially of

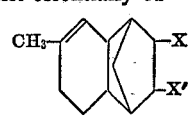

wherein one of the groups X and X' is hydrogen and the other is chlorine.

1.4 parts of sodium and 47 parts of tertiary butanol were charged to a rocking autoclave which was then flushed with nitrogen, sealed and heated to a temperature of 160° C. for 3 hours. The autoclave was then allowed to cool and was vented and charged with 10 parts of

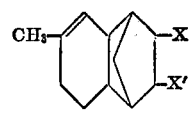

wherein one of the groups X and X' is hydrogen and the other is chlorine. The autoclave was flushed with nitrogen, sealed and heated at a temperature of 200° C. for 2 hours. After allowing the autoclave to cool the contents were extracted with 60/80 petroleum ether, and the extract was then washed with aqueous sodium bicarbonate and dried over anhydrous sodium sulphate. The petroleum ether was then allowed to evaporate and the residue was distilled through a 2 ft. Vigreux column and 3.9 parts of

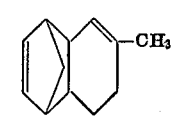

distilling in the range 86° C. to 90° C. at 10 mm. Hg pressure were collected.

The structure of

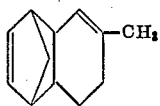

was established by NMR spectroscopy.

Example 3

The isomerisation procedure of Example 2 was repeated except that the aqueous solution of perchloric acid was replaced by 18.4 parts of concentrated sulphuric acid having a specific gravity of 1.835 g./ml. The isomerisation, extraction, washing and distillation procedure of Example 2 was followed to produce 9.5 parts of

wherein one of the groups X and X' is hydrogen and the other is chlorine. Analysis of

by gas-liquid chromatography showed it to be essentially pure.

Following the procedure of Example 2 the

was heated in an autoclave with sodium and tertiary butanol, which themselves had been preheated as in Example 2, and the contents of the autoclave were cooled, extracted, washed and distilled to yield

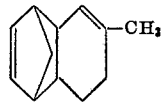

in substantially similar yield.

Example 4

30 parts of

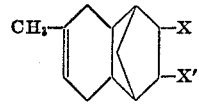

wherein one of X and X' is hydrogen and the other is chlorine (prepared as described in Example 1) and 47.2 parts of an aqueous solution of hydrochloric acid having a specific gravity of 1.18 g./ml. were charged to a flask as used in Example 2 and heated with stirring for 16 hours at a temperature of 60° C. The contents of the flask were then allowed to cool, poured into water, extracted with 60/80 petroleum ether, washed with sodium bicarbonate solution, dried and distilled following the procedure of Example 2 to yield 21 parts of an essentially pure fraction of

distilling in the range 124° C. to 130° C. at 10 mm. Hg pressure. The procedure of Example 2 was followed to produce

 from the 

in substantially similar yield.

Example 5

50 parts of

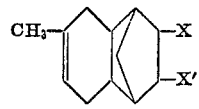

wherein one of X and X' is hydrogen and the other is chlorine (prepared as described in Example 1), 670 parts of methylene dichloride and 4 parts of ferric chloride were charged to a flask and stirred at room temperature for one hour.

The contents of the flask were then poured into water, extracted with 60/80 petroleum ether, washed with sodium bicarbonate solution, dried and distilled following the procedure of Example 2 to yield 23.7 parts of an essentially pure fraction of

(as analysed by gas-liquid chromatography) distilling in the 125 to 130° C. at 10 mm. Hg pressure.

The procedure of Example 2 was then followed to produce

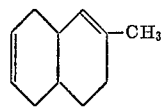

from

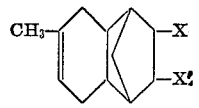

in substantially similar yield.

Example 6

In four separate experiments the procedure of Example 5 was followed separate mixtures of 50 parts of

wherein one of X and X' is hydrogen and the other is chlorine (prepared as described in Example 1) and 670 parts of methylene chloride being stirred at room temperature with, respectively, (i) 4 parts of anhydrous aluminium chloride for 2 hours, (ii) 4 parts of stannic chloride for 1 hour, (iii) 4 parts of anhydrous zinc chloride for 24 hours and (iv) 4 parts of antimony pentachloride for 1 hour.

Each of the resultant mixtures was poured into water, extracted, washed, dried and distilled following the procedure of Example 5, and a fraction boiling in the range 125° C. to 130° C. at 10 mm. Hg pressure collected.

Each of the fractions was analysed by gas-liquid chromatography following the procedure of Example 1 with the following results.

(i) fraction comprised 80% by weight of

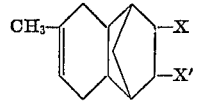

and 20% by weight of (ii) fraction consisted essentially of

(iii) fraction comprised 60% by weight of

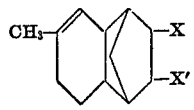

and 40% by weight of

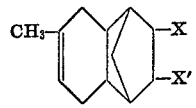

(iv) fraction consisted essentially of

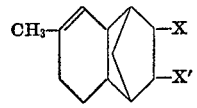

The procedure of Example 2 was then followed with each of the above fractions to produce

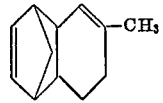

or a mixture thereof with

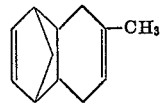

in substantially similar yield.

Example 7

Following the procedure of Example 1 a stainless steel autoclave was charged with 186 parts of dicyclopentadiene and 325 parts of vinyl chloride. The autoclave was then sealed, heated to a temperature of 190° C. maintained at this temperature of 3 hours, allowed to cool to room temperature and vented, and the unreacted vinyl chloride allowed to evaporate.

The contents of the autoclave were charged to a distillation apparatus and distilled through a 2 ft. silvered vacuum jacketed column packed with glass helices. An initial fraction distilling at temperatures up to 50° C. at 15 mm. Hg pressure was discarded and two further fractions were collected; 70.5 parts of norbornenyl chloride distilling at 52° C. at 15 mm. Hg pressure and 49 parts of

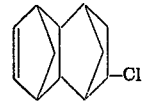

distilling in the range 140° C. to 148° C. at 15 mm. Hg pressure. 13.5 parts of undistilled residue remained in the distillation flask.

A stainless steel autoclave was flushed with nitrogen and charged with 45 parts of

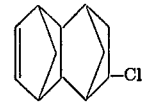

and 8 parts of isoprene. The autoclave was sealed, heated to a temperature of 170° C., maintained at this temperature for 3 hours and thereafter allowed to cool and the contents of the autoclave charged to a distillation apparatus and distilled through a 2 ft. silvered vacuum jacketed column packed with glass helices.

2.6 parts of an initial fraction distilling at temperatures up to 118° C. at 7 mm. Hg pressure were discarded and three further fractions were collected; 23 parts of unreacted

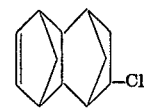

distilling at 118° C. to 135°C. at 7 mm. Hg pressure (mainly 125° C.), 6 parts of a fraction distilling at 135° C. to 162° C. at 7 mm. Hg pressure and 9.3 parts of

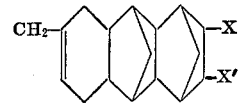

wherein one of the groups X and X' is hydrogen and the other is chlorine, distilling at 162 to 195° C. at 7 mm. Hg pressure (mainly 192° C.).

Following the procedure of Example 58 parts of

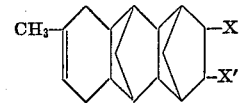

107 parts of methylene chloride and 0.08 part of ferric chloride were charged to a flask and stirred at room temperature for 2 hours.

The contents of the flask were then poured into water, extracted, washed, dried and distilled following the procedure of Example 2 and 2.8 parts of a fraction boiling within the range 155° C. to 160° C. at 1 mm. Hg pressure collected. The fraction was analysed by gas-liquid chromatography and found to consist essentially

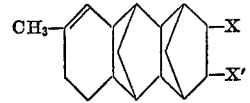

the structure being established by nuclear magnetic resonance spectroscopy.

Following the procedure of Example 2 the

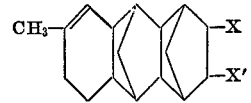

was heated in an autoclave with sodium and tertiary butanol which had themselves been preheated as in Example 2 and the contents of the autoclave were cooled, extracted, washed, dried and distilled and a fraction boiling the range 160° C. to 190° C. at 8 mm. Hg pressure collected. The fraction was analysed by gas-liquid chromatography and found to consist essentially of

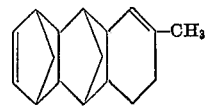

the structure being established by nuclear magnetic resonance spectroscopy.

Example 8

200 parts of

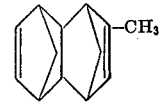

(boiling point 86° C. to 90° C. at 9 mm. Hg pressure and prepared by heating norbornadiene and isoprene in a molar ratio of 4:1 in an autoclave under nitrogen for 15 hours at 170° C.) and 380 parts of an aqueous solution of hydrochloric acid having a specific gravity of 1.18 g./ ml. were charged to a flask and heated at 80° C. for 6 hours.

Following the procedure of Example 2 the contents of the flask were allowed to cool and were poured into water, extracted, washed, dried and distilled following the procedure of Example 2 and 128 parts of a fraction boiling in the range 124° C. to 132° C. at 10 mm. Hg pressure were collected. This fraction was shown by analysis by gas-liquid chromatography to consist essentially of

wherein one of X and X' is hydrogen and the other chlorine, the hydrochloric acid used as the isomerisation catalyst having added across the carbon-carbon double bond in the endomethylene bridged ring.

Thereafter the procedure of Example 2 was followed to produce

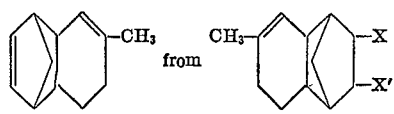

in substantially similar yield.

Example 9

50 parts of

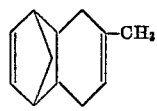

670 parts of methylene chloride and 4 parts of ferric chloride were charged to a flask and stirred at room temperature for 24 hours.

The contents of the flask were then poured into water, extracted, washed, dried and distilled following the procedure of Example 2 and a fraction boiling in the temperature range 80° C. to 95° C. at 10 mm. Hg pressure collected. The fraction was analysed by gas-liquid chromatography and shown to contain 30% by weight of

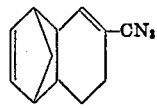

and 70% by weight of

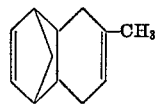

Example 10

1100 parts of dry and oxygen free dimethyl sulphoxide, 170 parts of

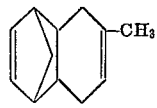

and 100 parts of potassium tertiary butoxide were charged to a flask and heated under nitrogen with stirring for 24 hours at 70° C.

The contents of the flask were then allowed to cool and were poured into water, extracted, washed, dried and distilled following the procedure of Example 2 and a fraction boiling in the temperature range 80° C. to 95° C. at 10 mm. Hg pressure collected. The fraction was analysed by gas-liqiud chromatography and shown to contain 20% by weight of

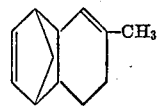

and 80% by weight of

Example 11

The polymerisation apparatus consisted of a flanged flask provided with tubes for feeding and discharging gases, a stirrer, a thermometer and a serum cap through which the diene and catalysts could be introduced. The tube for introducing the gases reached the bottom of the vessel and the apparatus was kept at a constant temperature of −20° C.

The flask was filled half full with 684 parts of anhydrous heptane which was then saturated at −20° C. by passing through it for 15 minutes a mixture of propylene and ethylene in a molar ratio of 4:1. The flow rate of the gas mixture was equivalent to 8.5 times the total volume of the solvent in the flask per minute. 1.9 parts of the mixture of dienes comprising 86% by weight of

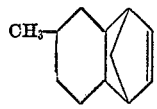

and 14% by weight of

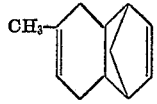

prepared in Example 1 where then introduced into the apparatus followed by 0.302 part of diethyl aluminium chloride as a solution in about 0.52 part of heptane and 0.097 part of vanadium tetrachloride as a solution in about 1.0 part of heptane and polymerisation commenced immediately. After a polymerisation period of 15 minutes 7.93 parts of methanol were added to deactivate the catalyst and the polymer solution was washed with dilute HCl to remove catalyst residues. The polymer was precipitated by addition of the solution to an excess of methanol. It was then spread out on a tray and dried overnight in a vacuum oven.

49.5 parts of polymer having an intrinsic viscosity, measured at 30° C. in a solution of the polymer in chloroform, of 3.22 dl. g.$^{-1}$ were obtained.

100 parts by weight of the polymer were then compounded on a laboratory roll-mill with 1.5 parts of sulphur, 5 parts of zinc oxide, 1 part of stearic acid, 1.5 parts of tetramethyl thiuram monosulphide, 0.5 part of mercaptobenzothiazole and 50 parts of HAF carbon black and a small sample of the thus compounded polymer was vulcanised in a Wallace-Shawbury Curometer. The Curometer indicated that a time of 18 minutes at 160° C. was required to achieve 95% of the maximum cure.

Three separate samples of the remaining compounded polymer were cured in a hydraulic press at a temperature of 160° C. for, respectively, 15, 20 and 30 minutes, to form ⅛ inch thick sheets.

Standard dumbell-shaped specimens having between the shoulders a neck 1 inch long and ⅙ inch wide were cut from the cured sheets. The tensile strength at break, the modulus, and the elongation to break of each specimen were measured on a Type E Tensometer using a rate of elongation of 20±2 inches/minutes at room temperature.

The properties of the cured sheets are shown in the following table.

| Cure time, minutes: | Temperature, °C. | 300% modulus, lbs./sq. in. | Percent elongation at break | Tensile strength, lbs./sq. in. |
|---|---|---|---|---|
| 15 | 160 | 848 | 841 | 2,490 |
| 20 | 160 | 801 | 885 | 2,377 |
| 30 | 160 | 908 | 790 | 2,543 |

Example 12

The polymerisation procedure of Example 11 was repeated except that at 5 minutes and 10 minutes after the introduction of the second of the catalyst components, i.e. the solution of vanadium tetrachloride in heptane, a further 1.43 parts and 0.48 part respectively of the mixture of dienes were introduced into the polymerisation medium.

The polymerisation was continued for a total of 15 minutes and 40 parts of polymer were obtained having an intrinsic viscosity, measured as in Example 11 of 3.38 dl. g.$^{-1}$.

100 parts of the polymer were compounded following the procedure of Example 11. Testing on the Curometer indicated a time to 95% of the maximum cure of 9 minutes at 160° C. Three separate samples of the compounded polymer were cured under pressure in a hydraulic press at 160° C. for 5, 10 and 20 minutes respectively to form ⅛ inch thick sheets.

The properties of the cured sheets are shown in the following table.

| Cure time, minutes: | Temperature, °C. | 300% modulus, lbs./sq. in. | Percent elongation at break | Tensile strength, lbs./sq. in. |
|---|---|---|---|---|
| 5 | 160 | 750 | 843 | 2,863 |
| 10 | 160 | 906 | 810 | 2,855 |
| 20 | 160 | 1,093 | 670 | 2,875 |

Example 13

The polymerisation procedure of Example 11 was repeated except that 2.85 parts of the mixture of dienes were charged to the flask before polymerisation commenced and 5 and 10 minutes after the introduction of the second of the catalyst components a further 1.90 parts and 0.95 part respectively of the mixture of dienes were introduced into the polymerisation medium.

The polymerisation was continued for a total of 15 minutes and 30 parts of polymer were obtained having an intrinsic viscosity, measured as in Example 11, of 3.70 dl. g.$^{-1}$.

100 parts of the polymer were compounded following the procedure of Example 11. Testing on the Curometer indicated a time to 95% of the maximum cure of 15 minutes at 150° C. Three separate samples of the compounded polymer were cured under pressure in a hydraulic press at 150° C. for 15, 20 and 25 minutes respectively to form ⅛ inch thick sheets.

The properties of the cured sheets are shown in the following table.

| Cure time, minutes: | Temperature, °C. | 300% modulus, lbs./sq. in. | Percent elongation at break | Tensile strength, lbs./sq. in. |
|---|---|---|---|---|
| 15 | 150 | 1,737 | 363 | 2,097 |
| 20 | 150 | 1,743 | 337 | 1,910 |
| 25 | 150 | 1,830 | 345 | 2,135 |

Example 14

The polymerisation procedure of Example 11 was repeated except that 2.13 parts of the diene

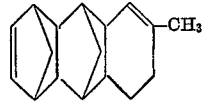

(prepared as in Example 7) were used in place of the mixture of dienes used in Example 2.

48.7 parts of polymer were obtained having an intrinsic viscosity, measured as in Example 2, of 2.50 dl. g.$^{-1}$.

100 parts of the polymer were compounded following the procedure of Example 11. Testing on the Curometer indicated a time to 95% of the maximum cure of 52 minutes at 150° C. Three separate samples of the compounded polymer were cured under pressure in a hydraulic press at 160° C. for respectively 26, 31 and 36 minutes to form ⅛ inch thick sheets. The properties of the cured sheets are shown in the following table.

| Cure time, minutes: | Temperature, °C. | 300% modulus, lbs./sq. in. | Percent elongation at break | Tensile strength, lbs./sq. in. |
|---|---|---|---|---|
| 26 | 160 | 708 | 780 | 1,850 |
| 31 | 160 | 782 | 610 | 1,772 |
| 36 | 160 | 877 | 690 | 2,045 |

What we claim is:

1. A polycyclic diene having the structure

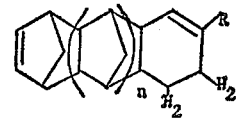

(I)

where R is a hydrocarbyl group and n is zero or an integer, or a derivative of said polycyclic diene of structure I in which one or more of the cyclic carbon atoms other than those forming part of a carbon-carbon double bond in an endomethylene bridged ring and those indicated as carrying hydrogen atoms carries a further hydrocarbyl substituent group.

2. A polycyclic diene as claimed in claim 1 in which n is zero or an integer in the range 1 to 3.

3. A polycyclic diene as claimed in claim 1 in which n is zero.

4. A polycyclic diene as claimed in claim 1 in which R is an alkyl group having from 1 to 10 carbon atoms.

5. A mixture of polycyclic dienes consisting of
  (i) from 1% to 99% by weight of a polycyclic diene having the structure

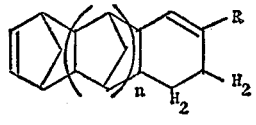

(I)

where R is a hydrocarbyl group and n is zero or an integer, and
  (ii) from 99% to 1% by weight of a polycyclic diene having the structure

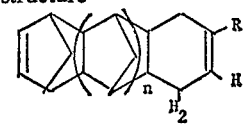

(III)

or derivatives of said polycyclic dienes in which one or more of the cyclic carbon atoms other than those forming part of a carbon-carbon double bond in an endomethylene bridged ring and those indicated as carrying hydrogen atoms carries a further hydrocarbyl substituent group.

6. A process for the preparation of a polycyclic diene as claimed in claim 1 which consists of either
  (i) isomerising a polycyclic diene having the structure

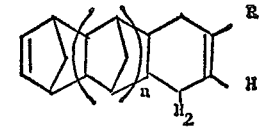

(III)

or (ii) isomerising a substituted polycyclic monoene having the structure

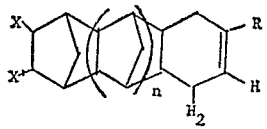

(IV)

to an intermediate having the structure

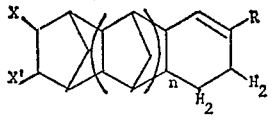

(V)

and subsequently eliminating X and X' from the intermediate, where X and X' are atoms or groups which may be eliminated from the intermediate with the formation of a double bond between the carbon atoms to which X and X' were attached, and in which in the polycyclic diene having the structure III and the polycyclic monoene having the structure IV, R is a hydrocarbyl group and $n$ is zero or an integer and the cyclic carbon atoms other than those forming part of a carbon-carbon double bond in an endomethylene bridged ring and those indicated as carrying hydrogen atoms and atoms or groups X and X' are unsubstituted or one or more of said carbon atoms carries a further hydrocarbyl substituent group.

7. A process for the preparation of a mixture of polycyclic dienes as claimed in claim 5 which consists of ether
(i) isomerising a polycyclic diene having the structure

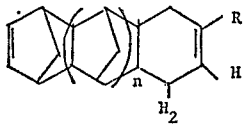

(III)

(ii) isomerising a substituted polycyclic monoene having the structure

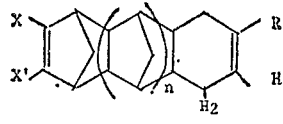

(IV)

to an intermediate having the structure

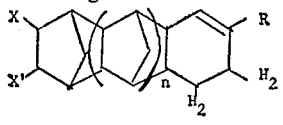

(V)

and subsequently eliminating X and X' from the intermediate, where X and X' are atoms or groups which may be eliminated from the intermediate with the formation of a double bond between the carbon atoms to which X and X' were attached, in which in the polycyclic diene having the structure III and the polycyclic monoene having the structure IV, R is a hydrocarbyl group and $n$ is zero or an integer and the cyclic carbon atoms other than those forming part of a carbon-carbon double bond in an endomethylene bridged ring and those indicated as carrying hydrogen atoms and atoms or groups X and X' are unsubstituted or one or more of said carbon atoms carries a further hydrocarbyl substituent group.

8. A process as claimed in claim 6 which is effected in the presence of an isomerisation catalyst therefor selected from the group consisting of acidic catalysts, basic catalysts, and Friedel-Crafts catalysts.

9. A process as claimed in claim 8 in which the acidic catalyst is selected from the group consisting of hydrochloric acid, sulphuric acid and perchloric acid.

10. A process as claimed in claim 9 in which isomerisation is effected at a temperature in the range 50° C. to 120° C.

11. A process as claimed in claim 8 in which the basic catalyst is an alkali metal alkoxide in an aprotic diluent.

12. A process as claimed in claim 11 in which the basic catalyst is potassium tertiary butoxide in dimethyl sulphoxide.

13. A process as claimed in claim 11 in which the isomerisation is effected at a temperature in the range 20° C. to 70° C.

14. A process as claimed in claim 8 in which the Friedel-Crafts catalyst is selected from the group consisting of ferric chloride, zinc chloride, antimony pentachloride, aluminium chloride and stannic chloride.

15. A process as claimed in claim 14 in which the isomerisation is effected at or near ambient temperature.

16. A process as claimed in claim 6 in which one of X and X' in the intermediate of structure V is hydrogen and the other is halogen.

17. A process as claimed in claim 16 in which XX' is eliminated from the intermediate by reaction with a base.

18. A process as claimed in claim 17 in which the base is an alkali alkoxide.

References Cited

UNITED STATES PATENTS

| | | | |
|---|---|---|---|
| 3,345,419 | 10/1967 | Tinsley | 260—617 |
| 2,952,710 | 9/1910 | Fields | 260—648 C |
| 3,144,491 | 8/1964 | O'Connor et al. | 260—666 PY |
| 3,356,688 | 12/1967 | Mark | 260—648 C |
| 3,565,962 | 2/1971 | Walmsley | 260—666 PY |

OTHER REFERENCES

Renner et al., Kunstoffe, 53, 509–515, 1963.

Alder et al., Liebig Ann Chem. Bd. 627, pp. 47–59, 1959.

DELBERT E. GANTZ, Primary Examiner

V. O'KEEFE, Assistant Examiner

U.S. Cl. X.R.

260—80.78